(12) United States Patent
Abdou-Ahmed et al.

(10) Patent No.: US 10,926,358 B2
(45) Date of Patent: Feb. 23, 2021

(54) DRILLING DEVICE, METHOD, AND USE

(71) Applicant: Universität Stuttgart, Stuttgart (DE)

(72) Inventors: Marwan Abdou-Ahmed, Stuttgart (DE); Rudolf Weber, Stuttgart (DE); Volkher Onuseit, Stuttgart (DE)

(73) Assignee: Universitat Stuttgart, Stuttgart (DE)

( * ) Notice: Subject to any disclaimer, the term of this patent is extended or adjusted under 35 U.S.C. 154(b) by 480 days.

(21) Appl. No.: 15/389,244

(22) Filed: Dec. 22, 2016

(65) Prior Publication Data
US 2017/0182597 A1    Jun. 29, 2017

(30) Foreign Application Priority Data
Dec. 23, 2015 (EP) .................................... 15003671

(51) Int. Cl.
*B23K 26/00* (2014.01)
*B23K 26/388* (2014.01)
(Continued)

(52) U.S. Cl.
CPC ........ *B23K 26/388* (2013.01); *B23K 26/0643* (2013.01); *B23K 26/0648* (2013.01); *B23K 26/0676* (2013.01); *B23K 26/082* (2015.10); *B23K 26/382* (2015.10); *B23K 26/389* (2015.10); *G02B 5/1814* (2013.01); *G02B 5/1861* (2013.01); *G02B 5/1871* (2013.01); *G02B 27/4233* (2013.01)

(58) Field of Classification Search
CPC ............ B23K 26/0643; B23K 26/0648; B23K 26/0676; B23K 26/082; B23K 26/382; B23K 26/388; G02B 27/4233; G02B 5/1814; G02B 5/1861; G02B 5/1871

USPC .......................................... 219/121.6–121.83
See application file for complete search history.

(56) References Cited

U.S. PATENT DOCUMENTS 5,020,045 A  *  5/1991  Smart ................. G11B 7/08511
                                                    369/44.29
5,754,341 A  *  5/1998  Takata ................. G02B 5/1871
                                                         216/24

(Continued)

FOREIGN PATENT DOCUMENTS

JP    2005224841 A    8/2005
WO    2007000717 A1   1/2007

OTHER PUBLICATIONS

European Search Report dated Oct. 11, 2016 in European Patent Application No. 15003671.3, 9 pages.

*Primary Examiner* — Sang Y Paik
(74) *Attorney, Agent, or Firm* — Shook, Hardy & Bacon L.L.P.

(57) ABSTRACT

The invention relates to a drilling device comprising a light source configured to provide a light beam and a diffractive beam propagation device having a substantially planar surface, wherein the light source is configured such that the light beam is incident on the planar surface of the diffractive beam propagation device, and wherein the diffractive beam propagation device is configured to propagate the light beam as one or more propagated beams such that the one or more propagated beams, at least when being integrated over time, surround an area with a substantially circular shape. A use of the drilling device for drilling a hole in a work piece and a method suitable for drilling a hole in a work piece are also provided.

12 Claims, 9 Drawing Sheets

(51) Int. Cl.
*B23K 26/06* (2014.01)
*B23K 26/382* (2014.01)
*G02B 5/18* (2006.01)
*B23K 26/082* (2014.01)
*B23K 26/067* (2006.01)
*G02B 27/42* (2006.01)

(56) References Cited

U.S. PATENT DOCUMENTS

| | | | |
|---|---|---|---|
| 6,800,237 B1* | 10/2004 | Yamamoto | B23K 26/067 264/400 |
| 2003/0052102 A1* | 3/2003 | Amako | B23K 26/073 219/121.75 |
| 2005/0035102 A1* | 2/2005 | Amako | B23K 1/0056 219/121.73 |
| 2005/0088744 A1* | 4/2005 | Smith | G02B 5/1861 359/566 |
| 2006/0138351 A1* | 6/2006 | Jyumonji | B23K 26/03 250/492.2 |
| 2006/0152809 A1* | 7/2006 | Smith | G02B 5/1809 359/569 |
| 2009/0314755 A1* | 12/2009 | Chung | B23K 26/0608 219/121.77 |

\* cited by examiner

DRILLING DEVICE, METHOD, AND USE

CROSS-REFERENCE TO RELATED APPLICATIONS

This application claims priority to co-pending and foreign filed European Patent Application No. 15003671.3, titled "DRILLING DEVICE, METHOD, AND USE," which was filed on Dec. 23, 2015, the contents of which is incorporated herein by reference in its entirety.

BACKGROUND OF THE INVENTION

In laser machining, laser beams are generated by a light source and directed by an optical system to become incident on a work piece. Incidence of the laser beams on the work piece heats and/or melts and/or vaporizes and/or expels the material of the work piece. Conventionally, drilling is carried out by adjusting the angles/locations of incidence of the laser beams on the work piece.

US 2013/0175243 A1 is an example of a laser drilling device which includes a laser beam source and a laser drilling head. The laser drilling head includes a beam manipulator system, in which a moving mirror is provided which is dynamically and reciprocally translatable along the direction of the incoming laser beam and tiltable about an axis, as well as a compensation system comprising wedges. The drilling head also includes a spinnable laser beam rotating system, which comprises rotation elements which permit the laser beam to traverse the surface of the work piece. This drilling device, however, is complicated in that multiple stages including multiple translatable/rotatable components are required to direct the laser beam to be incident on the surface of the work piece as appropriate. Further, adjustment of the size of the area to be drilled requires adjustment of multiple components such as the mirror in the beam manipulator system and the wedges in the compensation system.

Therefore, it is desired to provide a simpler drilling device which is configured to rotate to drill a hole in a work piece and is simpler and easier to manufacture and adjust.

SUMMARY OF THE INVENTION

According to an aspect of the present invention, a drilling device is provided which comprises a light source configured to provide a light beam and a diffractive beam propagation device having a substantially planar surface. The light source is configured such that the light beam is incident on the planar surface of the diffractive beam propagation device. The diffractive beam propagation device is configured to propagate the light beam as one or more propagated beams such that the one or more propagated beams, at least when being integrated over time, surround an area with a substantially circular shape.

According to one embodiment, the diffractive beam propagation device may be further configured to rotate around a rotation axis substantially normal to the planar surface of the beam propagation device. Due to the rotation of the diffractive beam propagation device, also the one or more propagated beams rotate. Thus, the one or more propagated beams surround an area with a substantially circular shape when being integrated over time.

According to an alternative embodiment, the diffractive beam propagation device may comprise or be a circular diffraction grating. Due to the circular diffraction grating, the one or more propagated beams directly, i.e. also when being not integrated over time, surround an area with a substantially circular shape. For the circular diffraction grating, the one or more propagated beams form one or more cones. In particular, the one or more propagated beams form one cone in the case that only +/−1 order occurs, and two cones in the case that +/−1 order and +/−2 order occur. The cone is composed of the overlap of the diffracted beams at different azimuths.

"Planar" in the context of this application may describe a surface which closely resembles or is aligned with a plane. Such a surface may be characterized by relatively small "imperfections" or deviations from a truly perfect planar surface. For example, a real-world planar surface may contain ridges or crevices which have nonzero heights compared to the "perfect" planar surface. A three-dimensional object extends and has dimensions in each of an X-direction, a Y-direction, and a Z-direction (in a right-handed Cartesian coordinate system). A particular object, such as for example a diffractive beam propagation device, may have at least one surface which is substantially aligned with a plane, as an example with the Y-Z plane. The object may for example have the shape of a rectangular prism, having a length in the Y direction, a width in the Z direction, and a thickness in the X direction. In a real-world object, the planar surface aligned with the Y-Z plane will, as described above, have imperfections which, when compared to the thickness of the object in the X direction, may be relatively small. For example, heights of ridges and crevices constituting imperfections/deviations in a "planar surface" may have values which are orders of magnitudes smaller than the thickness of the object, for example less than $1/100^{th}$ or less than $1/1000^{th}$ of the thickness.

The light source is configured to provide a light beam. The light source is configured to provide a light beam which is incident on the planar surface of the diffractive beam propagation device, the light beam having characteristics appropriate for the particular application of the drilling device. The light source may, in an exemplary embodiment, be a laser light source configured to provide a laser beam with the appropriate power, coherence, wavelength, pulse length, and pulse cycle for a particular drilling application. For example, the laser light source may be configured to provide a laser beam with a wavelength within the visible spectrum of light, for example a green laser beam with a wavelength of 532 nm or 515 nm for drilling holes or curves with a width of 30 um to 1 mm. In another example, the light source may be configured to provide a laser beam with a wavelength within the infrared spectrum of light, for example a laser beam with a wavelength in the range of about 1030 nm to 1064 nm. In another example, the light source may be configured to provide a laser beam with a wavelength within the ultraviolet spectrum of light, for example a laser beam with a wavelength in the range of about 200 nm to 400 nm.

The diffractive beam propagation device is configured to propagate the light beam as one or more propagated beams. The diffractive beam propagation device may be of any type suitable for propagating the light beam as the one or more propagated beams. Advantageously, the drilling device can be small in size.

In some embodiments, the diffractive beam propagation device may comprise or consist of a diffraction grating. A diffraction grating may generally comprise grooves which are, for example, etched onto a planar surface of the grating. The term "planar" here refers to the characteristic of the surface before any such etching operation. That is, after etching grooves on a surface, the surface profile has necessarily changed since the grooves have nonzero depths.

Nevertheless, the term "planar surface" is still used in this application to refer to that same surface as the non-etched portion of the surface is still substantially aligned with a plane.

In some embodiments, the diffractive beam propagation device may comprise or consist of a reflective diffraction grating. The light beam may be incident on a "front" side of the planar surface of the diffractive beam propagation device such that the light beam is propagated as one or more propagated beams which are reflected away from the front side of the planar surface of the diffractive beam propagation device. In some embodiments, exactly one propagated beam of the one or more propagated beams comprises most of the total energy of the light beam, e.g. 90-95%, 95% or more, 99% or more, or, more preferably, 99.9% or more. In other embodiments, exactly two of the one or more propagated beams together comprise most of the total energy of the light beam. In these embodiments, the two propagated beams may each comprise approximately the same amount of energy.

The reflective diffraction grating may be one as known in the state of the art. For example, the reflective diffraction grating may comprise or consist of a grating waveguide mirror (GWM) comprising a fused silica substrate, a waveguide layer, and a grating with a period. The GWM may be characterized by a Littrow angle, the Littrow angle being determined based on the wavelength of the light beam and the period of the grating. The Littrow angle refers to the angle with respect to the normal of the planar surface of the GWM at which a light beam incident at this angle results in a −1st-order (or other order) diffracted beam at that same angle. The Littrow angle will be explained in more detail below along with the description of the figures.

In other embodiments, the diffractive beam propagation device may comprise or consist of a transmissive diffraction grating. The light beam may be incident on a "reverse" side of the planar surface of the transmissive diffraction grating such that the light beam is propagated from the reverse side of the planar surface through the "front" side of the planar surface of the grating. In these embodiments, the light beam may be split into one or more, particularly at least two, propagated beams, e.g. two, four, or six propagated beams, which together comprise most of the total energy of the light beam, e.g. at least 82%, particularly 90-95%, 95% or more, 99% or more, or, more preferably, 99.9% or more. A plurality of the propagated beams (e.g., exactly two of the propagated beams) may each comprise approximately the same amount of energy. Under normal incidence in the transmissive or transmission grating, there may be two (+/−1) or four (+/−1, +/−2), or six (+/−1, +1−2, +/−3), etc., diffracted orders. This is due to the symmetry of the configuration. However, it is also possible to design a transmission grating which has only one diffracted beam in transmission. For this purpose, the angle of incidence and/or the grating parameters need to be adapted correspondingly.

In some embodiments, the light beam is incident on the diffractive beam proagation device at an angle substantially normal to the planar surface of the diffractive beam propagation device such that the at least two propagated beams comprise two 1st-order beams (i.e., a +1st-order beam and a −1st-order beam).

In some embodiments, a 0-order beam is substantially canceled due to the grating depth of the diffractive beam propagation device, the grating depth being determined based on at least one of the wavelength of the one or more propagated beams, an index of refraction of the diffractive beam propagation device, and a duty cycle of the diffractive beam propagation device.

In some embodiments, $n^{th}$-order diffraction beams are substantially dampened by means of one or more apertures provided in the diffractive beam propagation device, wherein n in an integer is equal to or greater than 2.

In other embodiments, the diffraction grating may be a blazed grating having a constant line spacing along a lateral direction of the diffraction grating. The blazed grating may have a triangular, sawtooth-shaped cross section.

According to another embodiment of the present invention, the drilling device may further comprise a focusing system having an optical axis wherein the one or more propagated beams are incident on the focusing system and thereby become one or more direction-changed beams. That is, the portion(s) of the light beam which is/are diffracted but not direction-changed by the focusing system is/are referred to as propagated beams, and the portion(s) of the light beam which are diffracted and is/are direction-changed by the focusing system are referred to as direction-changed beams. Any focusing system suitable for this purpose may be employed. In some embodiments, the focusing system may consist of a single lens with a defined focal length to its focal plane. In some embodiments, the focusing system comprises further optical elements such as one or more of: lenses, mirrors, diffraction or other gratings, Fresnel lenses, and/or prisms.

In some embodiments, the diffractive beam propagation device may be provided such that an origin area of the one or more propagated beams may be substantially located at a focal plane of the focusing system, thereby changing the propagation directions of the propagated beams by the focusing system such that the propagated beams become direction-changed beams which are substantially parallel to each other. The origin area may correspond substantially to a single point or a small area. In some embodiments, the origin area may be substantially located at a focal point of the focusing system, the focal point corresponding to a point where all light beams originating or passing through this point which are incident on the focusing system become direction-changed beams which are substantially parallel to each other and to the optical axis of the focusing system. The focal point may correspond to an intersection of the optical axis with the focal plane.

In some embodiments, the diffractive beam propagation device may be provided such that the origin area of the propagated beams may be substantially located away from a focal plane of the focusing system, thereby changing the propagation directions of the propagated beams resulting in direction-changed beams which are substantially not parallel. The focal length of the focusing system may be in the range of 10 mm to 1 m, and particularly in the range of 20 mm to 500 mm.

In this embodiment, propagated beams originate at the origin area which is either closer to the focusing system than the focal plane of the focusing system or farther away from the focusing system than the focal plane of the focusing system. In some embodiments, the origin area is located along the optical axis, though not in the focal plane of the focusing system.

In another embodiment, the diffractive beam propagation device and/or focusing system are further configured to translate relative to each other, relative to a work piece, or relative to other components of the drilling device including the light source. That is, some components of the drilling device may be fixed in location while other components may be configured to translate relative to the fixed components, for example substantially along the optical axis of the focusing system. In another embodiment, translation of the diffractive beam propagation device and/or focusing system from a first position to a second position may change a first distance and angle between the direction-changed beams when the diffractive beam propagation device is at the first position, to a second distance and angle between the direction-changed beams when the diffractive beam propagation device is at the second position.

In some embodiments, the distance between the direction-changed beams is set at least in part based on at least one of a grating period of the diffractive beam propagation device, a grating depth of the diffractive beam propagation device, the focal length of the focusing system (if provided), a wavelength of the light beam and the one or more propagated beams, and the origin area of the one or more propagated beams. In other words, the distance between the direction-changed beams may be determined at least in part by characteristics of the diffraction grating and the light beam.

In some embodiments, the diffraction grating is configured to split the light beam into four split beams in a two-dimensional arrangement. To this end, the diffraction grating may comprise a circular grating or a Fresnel lense. According to these embodiments, a cone of light can be obtained.

In some embodiments, the drilling device further comprises a work piece, wherein the one or more propagated beams or the one or more direction-changed beams are configured to be incident on a surface of the work piece, wherein the drilling device is optionally configured to drill a hole in the work piece by rotation of the diffractive beam propagation device around the rotation axis. In some embodiments, rotation of the diffractive beam propagation device around the rotation axis is configured to cause the propagated beams or the direction-changed beams to drill one substantially circular, cylindrical, or conical hole.

Preferably, the drilling device comprises a beam splitter for splitting the light beam into a plurality of individual light beams. Further, the drilling device preferably comprises for each of the individual light beams a corresponding individual diffractive beam propagation device, wherein the individual diffractive beam propagation devices are configured and aligned such that each of the individual light beams is incident on the corresponding individual diffractive beam propagation device. Thereby, a predetermined arrangement of holes can be created, e.g. in a circular design.

Another aspect of the invention relates to use of a drilling device according to the preceding description for drilling a hole in a work piece.

Another aspect of the invention relates to a method for drilling a hole in a work piece, comprising the steps of providing a light source and a diffractive beam propagation device having a substantially planar surface, wherein the light source provides a light beam incident on the planar surface of the diffractive beam propagation device, the diffractive beam propagation device propagates the light beam as one or more propagated beams, and the diffractive beam propagation device rotates around a rotation axis substantially normal to the planar surface of the diffractive beam propagation device. Incidence of the rotating split beams on a surface of a work piece may result in drilling of the work piece.

In preferred embodiments of the above method, the result of the step of providing a light source and a diffractive beam propagation device may be any drilling device according to the invention including the above embodiments, i.e. according to the claims.

According to an aspect of the present invention, a drilling device is provided which comprises a light source configured to provide a light beam and a diffractive beam propagation device having a substantially planar surface. The light source is configured such that the light beam is incident on the planar surface of the diffractive beam propagation device. The diffractive beam propagation device is configured to propagate the light beam as one or more propagated beams. The diffractive beam propagation device is further configured to rotate around a rotation axis substantially normal to the planar surface of the beam propagation device. Due to the rotation of the diffractive beam propagation device, also the one or more propagated beams rotate. Thus, the one or more propagated beams surround an area with a substantially circular shape when being integrated over time.

According to an aspect of the present invention, a drilling device is provided which comprises a light source configured to provide a light beam and a diffractive beam propagation device having a substantially planar surface. The light source is configured such that the light beam is incident on the planar surface of the diffractive beam propagation device. The diffractive beam propagation device is configured to propagate the light beam as one or more propagated beams. The diffractive beam propagation device may comprise or be a circular diffraction grating. Due to the circular diffraction grating, the one or more propagated beams directly, i.e. also when being not integrated over time, surround an area with a substantially circular shape.

BRIEF DESCRIPTION OF THE FIGURES

Unless otherwise indicated, the following figures are schematic diagrams. Any reference to the Cartesian coordinate system in the figures relates to a right-handed Cartesian coordinate system in which, by convention, the depicted arrows illustrate a "positive" direction.

DETAILED DESCRIPTION OF THE INVENTION

The following detailed description relates to exemplary embodiments of the present invention. Other embodiments of the invention are possible as within the scope of the invention as defined by the appended claims.

Figure 1:
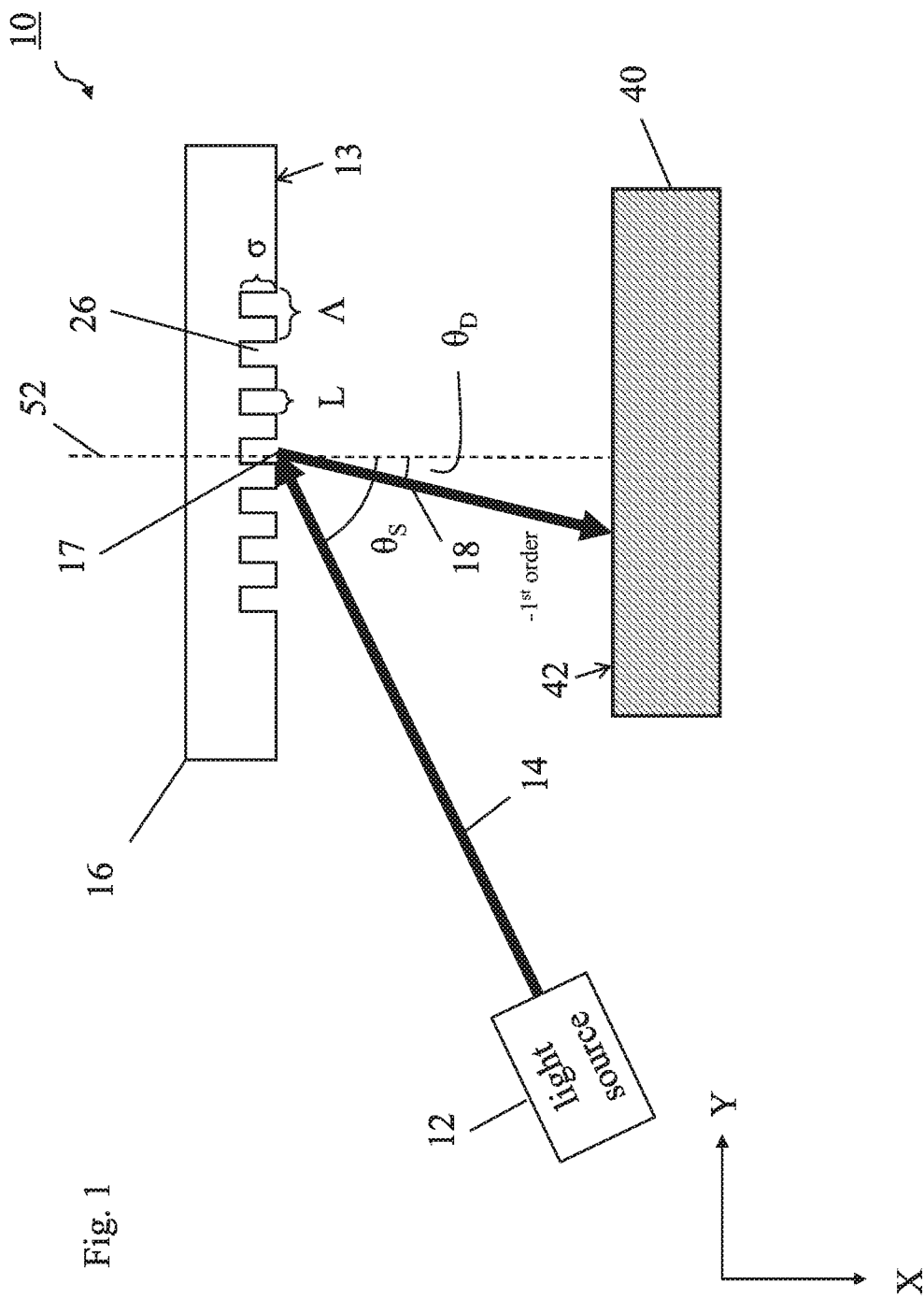
FIG. 1 illustrates an embodiment of the present invention in which the diffractive beam propagation device comprises or consists of a reflective diffraction grating wherein the light beam's incidence on the diffractive beam propagation device results in one −1st-order beam having most of the total energy of the light beam.

FIG. 1 illustrates a drilling device 10 according to the present invention. The drilling device 10 comprises a light source 12, which is configured to provide a light beam 14, and a diffractive beam propagation device 16 having a substantially planar surface 13. The light source 12 is configured such that the light beam 14 is incident on the planar surface 13 of the diffractive beam propagation device 16. The diffractive beam propagation device 16 is configured to propagate the light beam 14 as one or more propagated beams 18 and to rotate around a rotation axis 52 substantially normal to the planar surface 13 of the diffractive beam propagation device 16. In some embodiments, the drilling device 10 may be used to direct the propagated beams 18 to be incident on a surface 42 of a work piece 40. Incidence of the propagated beams 18 on the work piece 40 may heat and/or melt and/or vaporize and/or expel material of the work piece 40 to produce or extend holes and/or cuts in the work piece 40.

The diffractive beam propagation device 16 extends along a length direction (aligned with the Y direction), along a width direction (aligned with the Z direction) and along a thickness direction (aligned with the X direction) and has a substantially planar surface 13 (aligned with an Y-Z plane). "Substantially planar surface" in this application may, as explained above, refer to a surface of an object (for example a diffractive beam propagation device) which is substantially flat in profile compared to an overall thickness of the object. For example, a substantially planar surface may be one in which deviations in heights (e.g. in the X direction) of ridges/crevices on the surface compared to the plane (e.g. the Y-Z plane) of the surface of a component are small compared to an overall thickness of the component in the direction (X direction) perpendicular to the planar surface (Y-Z plane). As an example, ridges and/or craters on a planar surface may have heights whose magnitudes are less than $1/100^{th}$ of the thickness of the component, or preferably less than $1/1000^{th}$ of the thickness of the component. A "substantially planar surface" may also refer to a surface of a component which is substantially planar according to the above definition before material is added or removed. As will be explained below, the diffractive beam propagation device 16 may comprise or consist of a diffraction grating having grooves. The grooves may for example be etched on a surface which was substantially planar before the etching process was carried out. In this application, the surface of the diffractive beam propagation device may still be referred to as a planar surface. The grooves may alternatively be made by means of an index modification using, e.g., a femtosecond laser.

The light source 12 is configured to provide a light beam 14. The light source 12 is configured to provide the light beam 14 incident on the planar surface 13 of the diffractive beam propagation device 16 with characteristics appropriate for the particular application of the drilling device 10. The light source 12 may, in an exemplary embodiment, be a laser light source configured to provide a laser beam with the appropriate power, coherence, wavelength, pulse length, and pulse cycle or repetition rate for a particular application. For example, the laser light source may be configured to provide a laser beam with a wavelength within the visible spectrum of light, for example a green laser beam with a wavelength of 532 nm or 515 nm for drilling holes or lines with a width of 30 um to 1 mm. In another example, the light source may be configured to provide a laser beam with a wavelength within the infrared spectrum of light, for example a laser beam with a wavelength in the range of about 1030 nm to 1064 nm. In another example, the light source may be configured to provide a laser beam with a wavelength within the ultraviolet spectrum of light, for example a laser beam with a wavelength in the range of about 200 nm to 400 nm.

The diffractive beam propagation device 16 has a substantially planar surface 13. The diffractive beam propagation device 16 generally has a length extending along a length direction, for example the Y direction as depicted in FIG. 1; a width extending along a width direction, the Z direction; and a thickness extending alone a thickness direction, the X direction. With the sheet of paper on which FIG. 1 is printed considered to be a cross-section of an X-Y plane with no Z component, the Z direction is thus the direction perpendicular to the sheet of paper "into" and "out of" the sheet of paper. The length direction (Y) and the width direction (Z) characterize the two dimensions of the planar surface 13 (Y-Z plane).

Figure 2:
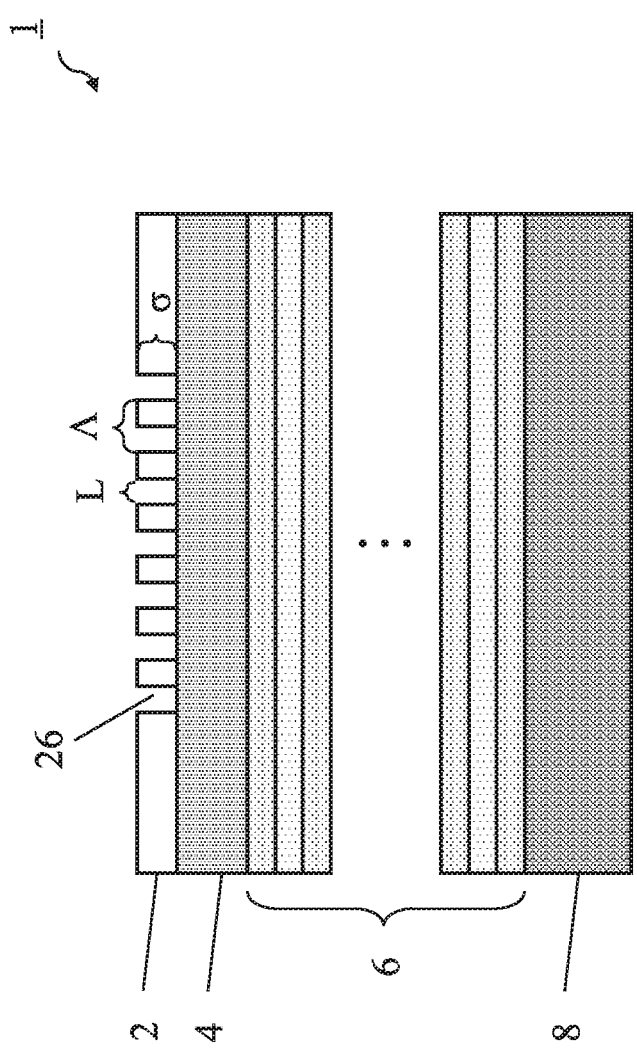
FIG. 2 illustrates an example reflective diffraction grating which is suitable for a drilling device according to the present invention.

In the embodiment of FIG. 1, the diffractive beam propagation device 16 comprises or consists of a reflective diffraction grating, for example such as the grating waveguide mirror (GWM) 1 depicted in FIG. 2, having grooves 26 in a grating layer 2 each of substantially uniform width L in a Y direction (i.e. substantially parallel to the length direction of the diffractive beam propagation device 16). In another embodiment, the widths L of the grooves 26 may not be uniform along the diffraction grating. The grooves 26 are further characterized by a substantially uniform depth σ in an X direction substantially parallel to the width direction of the diffractive beam propagation device 16. In another embodiment, the depths σ of the grooves 26 may not be uniform along the lateral direction (the Y direction). Further, the grooves 26 are characterized by a groove period Λ substantially along the Y direction, one period along the Y direction being defined as the distance from the side of one groove 26 to the corresponding side of an adjacent groove 26, as indicated in FIG. 2. The groove period Λ may be, in an embodiment, substantially uniform along the Y direction. In another embodiment, the groove period Λ may not be uniform along the Y direction. A duty cycle of the diffraction grating may be given by the widths L of the grooves 26 divided by the period Λ. The grooves 26 are also characterized by a length in the Z direction (i.e. parallel to the width direction of the diffractive beam propagation device 16). The grating parameters depend on many factors such as the laser wavelength or the diffraction angle relating to the desired size of holes to be drilled. However, for typical lasers and in case that the grating is used as a transmission grating, the grating period Λ can be, for example, in the range of 0.5λ to 100λ or 1λ to 100λ, where λ is the wavelength of the laser. The depth σ of the grating corresponds or is typically in the range of the wavelength λ, so that the $0^{th}$ transmitted order can be canceled. In case of a reflective grating, the grating period Λ can be, for example, in the range of 500-800 nm, but also in this case, the value may depend on many factors such as the laser wavelength or a separation angle.

The grating layer 2 of the GWM 1 may be stacked on a waveguide layer 4, which may in turn be stacked on highly reflective (HR) mirror 6. HR mirror 6 itself may comprise alternating layers of materials with a high refractive index (HRI) and materials with a low refractive index (LRI). HRI materials may be considered to be those with a refractive index between 2.0 and 2.6, such as for example (but not limited to) $Ta_2O_5$, $HfO_5$, $Nb_2O_5$, $TiO_2$, $Al_2O_3$, and $Si_3Ni_4$. LRI materials may be considered to be those with a refractive index between 1.4 and 1.6, such as for example (but not limited to) $SiO_2$ and $MgF_2$. The HR mirror may then be stacked on a substrate, such as fused silica. In this respect, reference is made to Marwan Abdou Ahmed et al.: "Applications of sub-wavelength grating mirrors in high power lasers", Adv. Opt. Techn. 2012, 1(5), pages 381-388, THOSS Media & DE GRUYTER, DOI 10.1515/aot-2012-0036 and to the International Patent Application PCT/EP 2014/053547 which is included by reference.

Referring again to FIG. 1, the diffractive beam propagation device 16 is configured to propagate the light beam 14 as one or more propagated beams 18. The diffractive beam propagation device 16 may be of any type suitable for propagating the light beam 14 as the one or more propagated beams 18.

The diffractive beam propagation device 16 may be configured to diffract the light beam 14 such that one propagated beam 18 comprises most, e.g. 99% or more, of the total energy of the light beam 14. In the embodiment of FIG. 1, the propagated beam 18 is a −1st-order diffracted beam. The light beam 14 is propagated (i.e. diffracted) substantially at an origin area 17 at the diffractive beam propagation device 16. The origin area 17 may, in some embodiments, be located substantially at an intersection between the rotation axis 52 and the planar surface 13 of the diffractive beam propagation device 16. This situation is illustrated in FIG. 1, for example. In some embodiments, the diffractive beam propagation device 16 may also diffract the light beam 14 into 0 and/or $2^{nd}$ or higher-order beams.

The diffractive beam propagation device 16 is provided such that the rotation axis 52 is substantially perpendicular to the planar surface 13 of the diffractive beam propagation device 16 (i.e., the rotation axis 52 is parallel to the X direction). The planar surface 13 of the diffractive beam propagation device 16 is substantially aligned with a Y-Z plane (with no X component) in FIG. 1, the Z direction considered to be the direction perpendicular to the X-Y plane in the figure. In other words, the sheet of paper on which FIG. 1 is printed may be considered to be a cross-section of a X-Y plane with no Z component, and the Z direction is thus the direction perpendicular to the sheet of paper "into" and "out of" the sheet of paper.

The light beam 14 may be incident on the planar surface 13 of the diffractive beam propagation device 16 at a light source angle $\theta_S$ with respect to the rotation axis 52 (again, the rotation axis 52 being substantially perpendicular to the planar surface 13 of the diffractive beam propagation device 16), as illustrated in FIG. 1. Based on the properties of the diffraction grating of the diffractive beam propagation device 16, the −1st-order beam (the propagated beam 18) may be diffracted at a diffraction angle $\theta_D$ with respect to the direction perpendicular to the surface of the diffractive beam propagation device 16 (the direction perpendicular to the surface of the diffractive beam propagation device 16 being parallel to the rotation axis 52 in this embodiment). The propagated beam 18 may be incident on a work piece 40.

Figure 3:
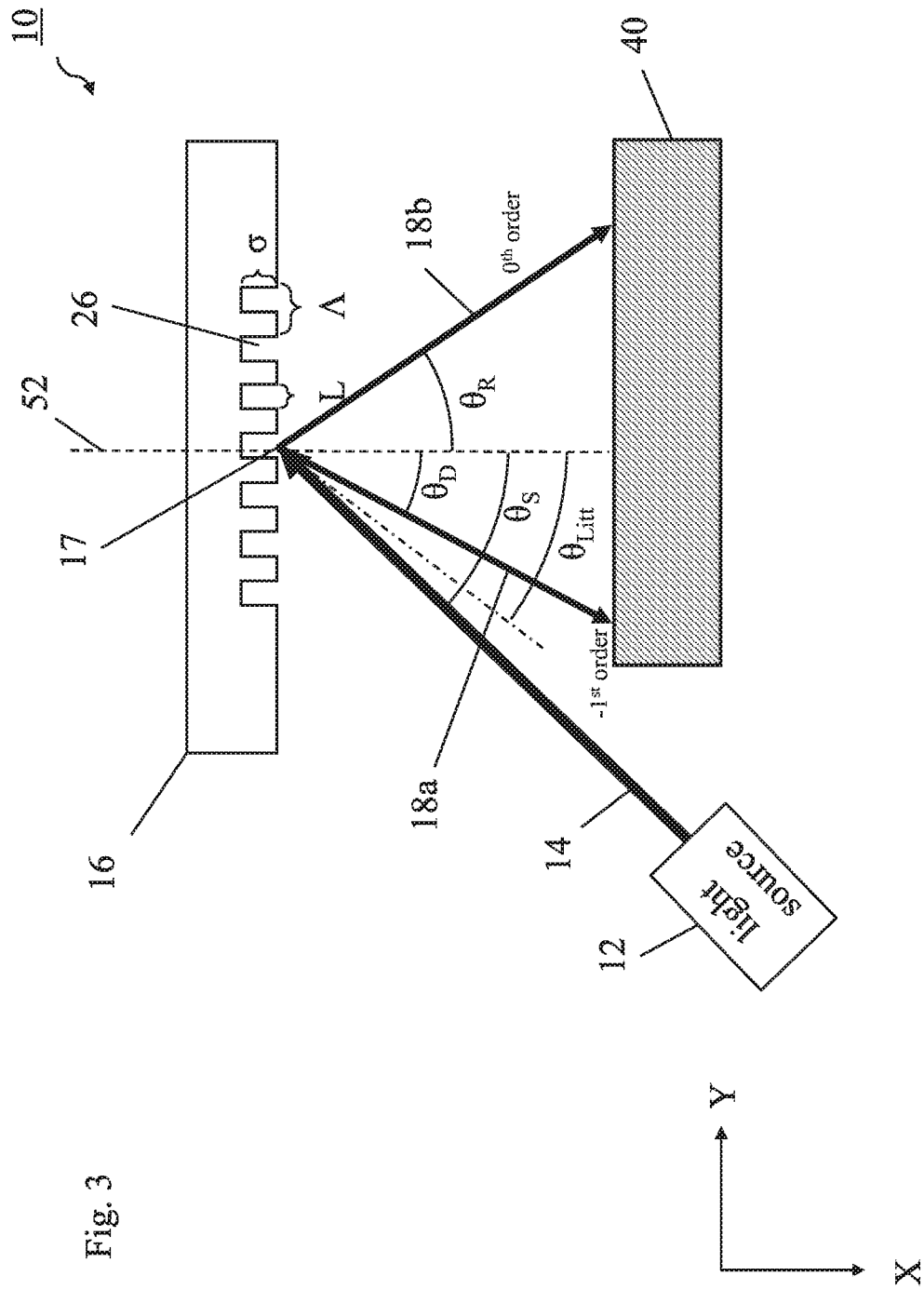
FIG. 3 illustrates an embodiment of the present invention similar to the one in FIG. 1 wherein a −1st-order beam and a 0-order ("zero-order") beam together comprise most of the total energy of the light beam.

FIG. 3 illustrates another embodiment of the present invention. The diffractive beam propagation device 16 of FIG. 3 may be similar or the same as the one in FIGS. 1 and/or 2. In FIG. 3, the light source angle $\theta_S$ approaches (i.e., is close but not equal to) the Littrow angle $\theta_{Litt}$ of a configuration. The Littrow angle $\theta_{Litt}$ of a configuration including a diffraction grating refers to the angle of incidence of a light beam on a diffraction grating at which a diffracted beam of a particular order m is diffracted back at the same angle. In the example of FIG. 3, if the light beam 14 were incident on the diffractive beam propagation device 16 at the (−1st-order) Littrow angle $\theta_{Litt}$ (i.e. $\theta_S=\theta_{Litt}$), the −1st-order propagated beam 18 would be diffracted back toward the light source 12 at the same angle, the Littrow angle $\theta_{Litt}$, (i.e. $\theta_D=\theta_S=\theta_{Litt}$). In other words, for example, a light beam incident on a diffraction grating in a Littrow configuration (i.e. at the Littrow angle) may have the result that a −1st-order beam diffracted from the light beam is counter-propagated at that same angle, the Littrow angle. The Littrow configuration is known in the state of the art and is characterized by the following equation:

$$\theta_{Litt} = \sin^{-1}\left(m\frac{\lambda}{2\Lambda}\right),$$

where $\theta_{Litt}$ is the Littrow angle, m is the grating diffraction order, $\lambda$ is the wavelength of the light beam (the incident beam), and $\Lambda$ is the grating period. Since the grating diffraction order m, the wavelength $\lambda$ of the light beam, and the grating period $\Lambda$ may be known, $\theta_{Litt}$ may be determined and thus also known for a particular configuration.

Figure 7:
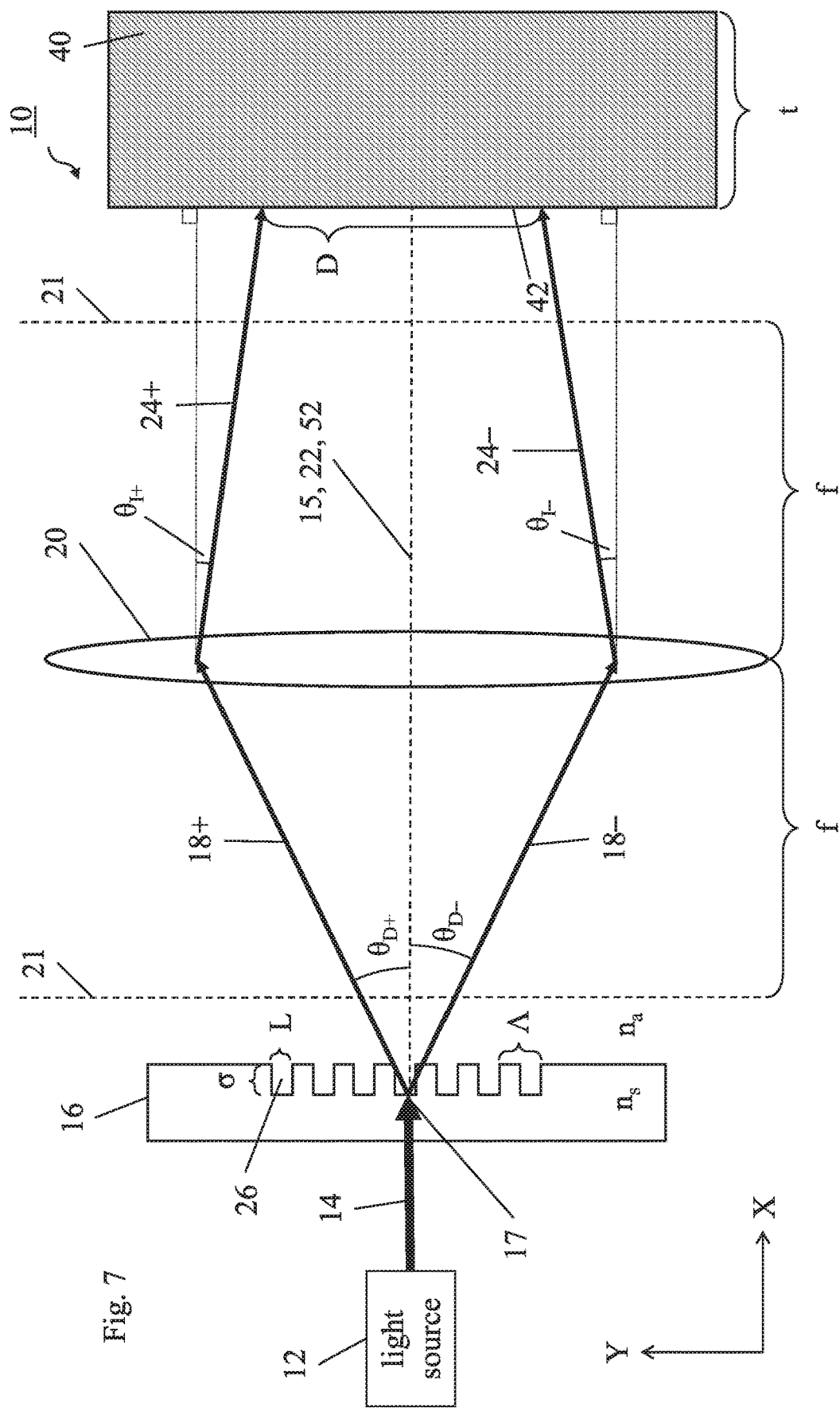
FIG. 7 illustrates an embodiment of the present invention in which the drilling device further comprises a focusing system.

In FIG. 3, the light source angle $\theta_S$ is "close" to but not equal to the Littrow angle $\theta_{Litt}$ (which is indicated in FIG. 3 by the dotted and dashed line) such that the (−1st-order beam 18a of the propagated beams 18 (18a, 18b) is diffracted at an angle $\theta_D$ slightly smaller than $\theta_{Litt}$. In other words, FIG. 3 illustrates a configuration, where the Littrow condition is not (but almost) met. In general, the light source angle $\theta_S$ may depend on the size of the hole to be drilled and/or a lens 20 (which is shown in FIG. 7). Specifically, the light source angle $\theta_S$ is slightly larger than (e.g. less than 7° larger than) the Littrow angle $\theta_{Litt}$ and the −1st-order beam 18a is diffracted at a diffraction angle $\theta_D$ slightly smaller than (e.g. less than 7° smaller than) the Littrow angle $\theta_{Litt}$. The 0-order beam 18b corresponds to reflection of the light beam 14 and has a reflection angle $\theta_R$ substantially equal to the light source angle $\theta_S$. In this embodiment, rotation of the diffractive beam propagation device 16 around the rotation axis 52 results in the drilling of a slightly elliptical-shaped hole in the work piece 40 since diffraction angle $\theta_D$ is slightly larger than reflection angle $\theta_R$.

Figure 4:
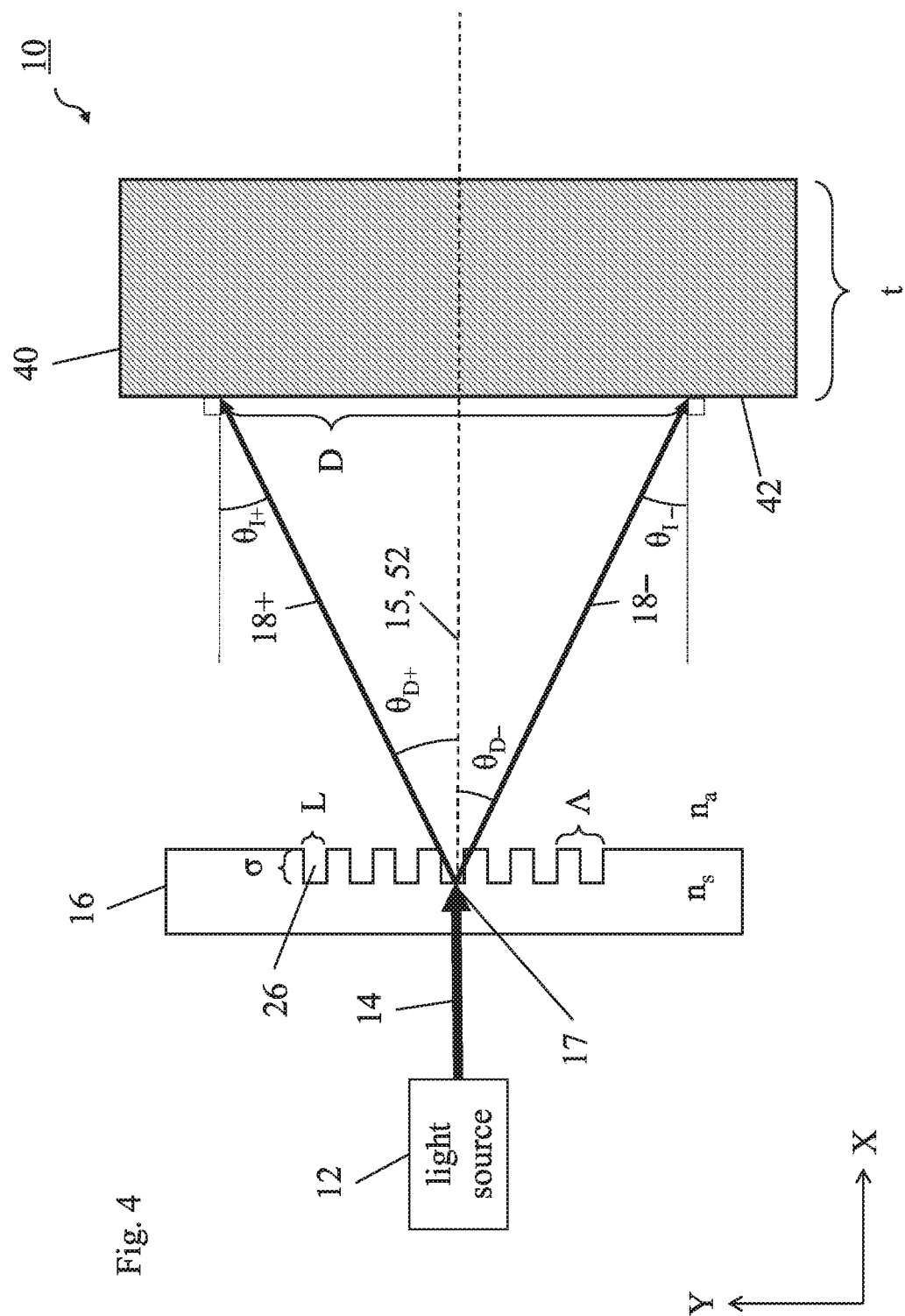
FIG. 4 illustrates an embodiment of the present invention in which the diffractive beam propagation device comprises or consists of a transmissive diffraction grating wherein the light beam is split into two 1st-order propagated beams, the two 1st-order propagated beams together comprising most of the total energy of the light beam.

FIG. 4 illustrates another embodiment of the present invention in which the diffractive beam propagation device 16 comprises or consists of a transmissive diffraction grating, wherein the diffractive beam propagation device 16 is configured to split the light beam 14 into at least two propagated beams 18 (18+, 18−, collectively referred to as "propagated beams 18"), wherein two of the propagated beams 18 together preferably comprise at least 80%, more preferably at least 90% and most preferably at least 99% (or further preferably at least 99.9%) of the total energy of the light beam 14. The two propagated beams 18 may each comprise approximately the same amount of energy. The diffractive beam propagation device 16 may, in an exemplary embodiment, comprise or consist of a diffraction grating comprising fused silica.

Like the diffractive beam propagation device 16 of FIGS. 1 and 3, diffractive beam propagation device 16 is characterized by grooves 26 having widths L, depths σ, and a period Λ, each of which may or may not be uniform along the diffraction grating. The diffractive beam propagation device 16 also has a planar surface 13 substantially aligned with the Y-Z plane of FIG. 4. In an exemplary embodiment, the light beam 14 is incident along an incidence direction 15 on one side (along the X direction) of the diffractive beam propagation device 16, which may be referred to as the "reverse" side, at an angle perpendicular to the planar surface 13 of the diffractive beam propagation device 16 (i.e. perpendicular to the Y-Z plane). In some embodiments, the incidence direction 15 may substantially correspond to the rotation axis 52, as shown in FIG. 4. The diffractive beam propagation device 16, comprising or consisting of a transmissive diffraction grating, is configured to allow the light beam to be transmitted through the diffractive beam propagation device 16 toward the other side (along the X direction) of the diffractive beam propagation device 16, which may be referred to as the "front" side. The diffraction grating may be arranged on the "front" and/or the opposite side, i.e. the "back" side, of the diffractive beam propagation device 16.

The diffractive beam propagation device 16 is configured to diffract/split the light beam 14 substantially at an origin area 17 into the at least two propagated beams 18. The origin area 17 may, in some embodiments, be located substantially at an intersection between the rotation axis 52 and the surface of the diffractive beam propagation device 16. This situation is illustrated in FIG. 4, for example. In an exemplary embodiment, the at least two propagated beams 18 comprise a +1st-order diffracted beam 18+ and a −1st-order diffracted beam 18−. The +1st-order diffracted beam 18+ is diffracted at a positive diffraction angle $\theta_{D+}$ with respect to the incidence direction 15 of the light beam 14, while the −1st-order diffracted beam 18− is diffracted at a negative diffraction angle $\theta_{D-}$ with respect to the incidence direction 15 of the light beam 14. The magnitudes of the positive diffraction angle $\theta_{D+}$ and the negative diffraction angle $\theta_{D-}$ may be substantially equal. That is, the following equation may be substantially fulfilled:

$$\theta_{D+} = \theta_{D-}.$$

In some embodiments, the propagated beams 18 may be incident on a surface of a work piece 40. In the case that a surface 42 of the work piece 40 is aligned substantially parallel to the planar surface 13 of the diffractive beam propagation device 16 (i.e. along the Y-Z plane), angles of incidence $\theta_{I+}$, $\theta_{I-}$, of the respective propagated beams 18+, 18− with respect to the surface 42 of the work piece may be substantially equal to the respective positive and negative diffraction angles $\theta_{D+}$, $\theta_{D-}$. The propagated beams 18 may be incident on the surface 42 of the work piece 40 and separated by a distance D, as illustrated in FIG. 4.

Figure 5:
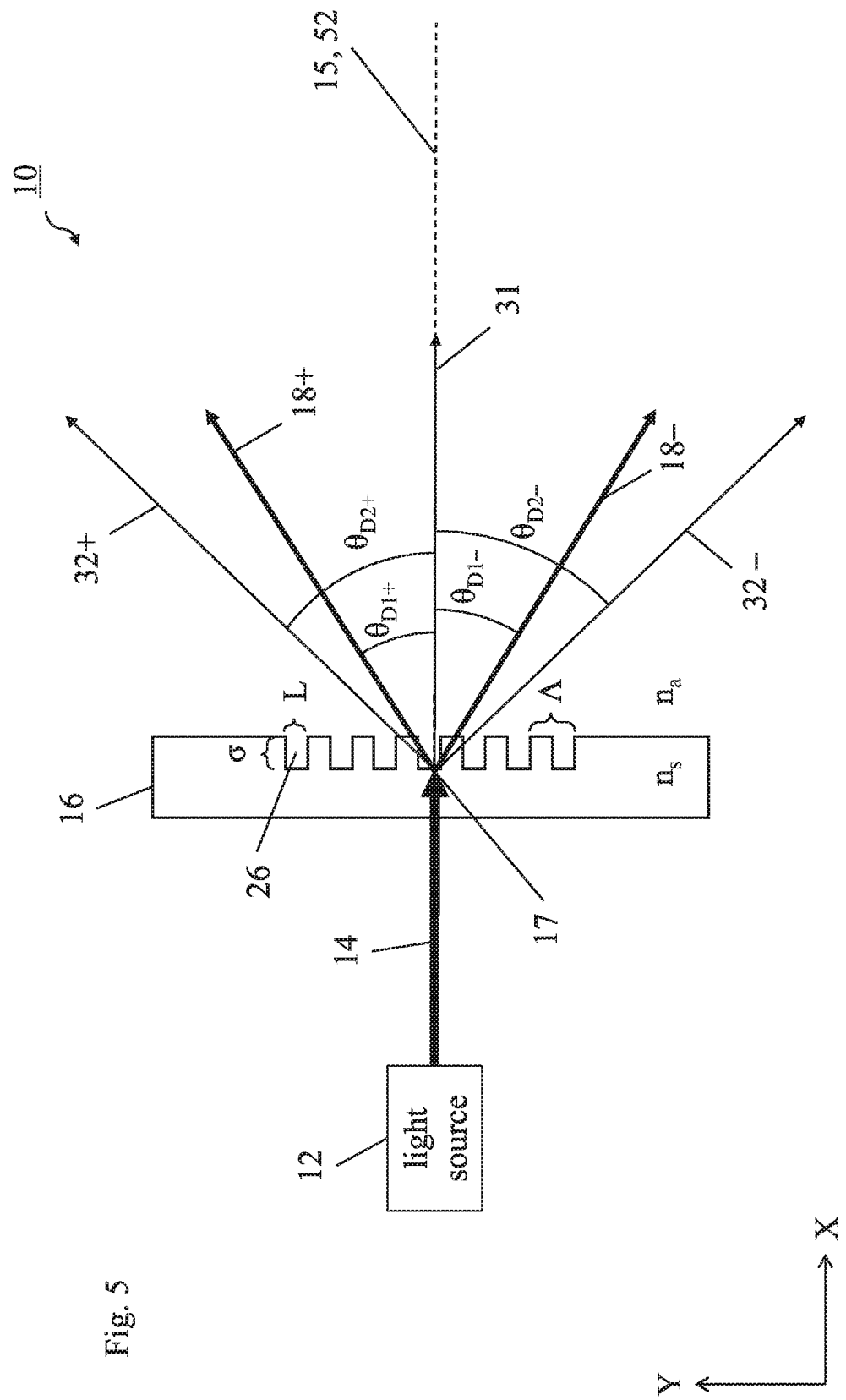
FIG. 5 illustrates an embodiment of the present invention similar to that in FIG. 4 in which a 0-order beam and multiple higher-order beams ($n^{th}$-order beams, $n \geq 2$) are depicted.

In some embodiments, it may be desired to substantially reduce a 0-order beam which would otherwise be incident on the work piece 40 (or on a focusing system, which will be described later). A 0-order beam 31 may be present at an angle of substantially zero from the incidence direction 15 of the light beam 14 on the diffractive beam propagation device 16, as shown in FIG. 5. The grating depth σ of the diffractive beam propagation device 16 may be configured based on the wavelength of the light beam 14 and/or an index of refraction $n_s$ of the diffraction grating and may be configured to reduce the 0-order beam 31. In order to cancel the 0th transmitted order, the grating structure is preferably configured to introduce a π-phase shift. In a scalar approximation, this phase shift is equal to 2 σ (n−1), where n is the refractive index of the material in which the grating is integrated. In case of a grating with a high aspect-ratio and for a grating period in the range of the wavelength, then a more precise formula would take into account the indices of modes excited in the grating region and $$\sigma = \frac{\lambda}{2}(n_{e1} - n_{e2}),$$

where $n_{e1}$ and $n_{e2}$ are the refractive indices of the excited modes.

Figure 6:
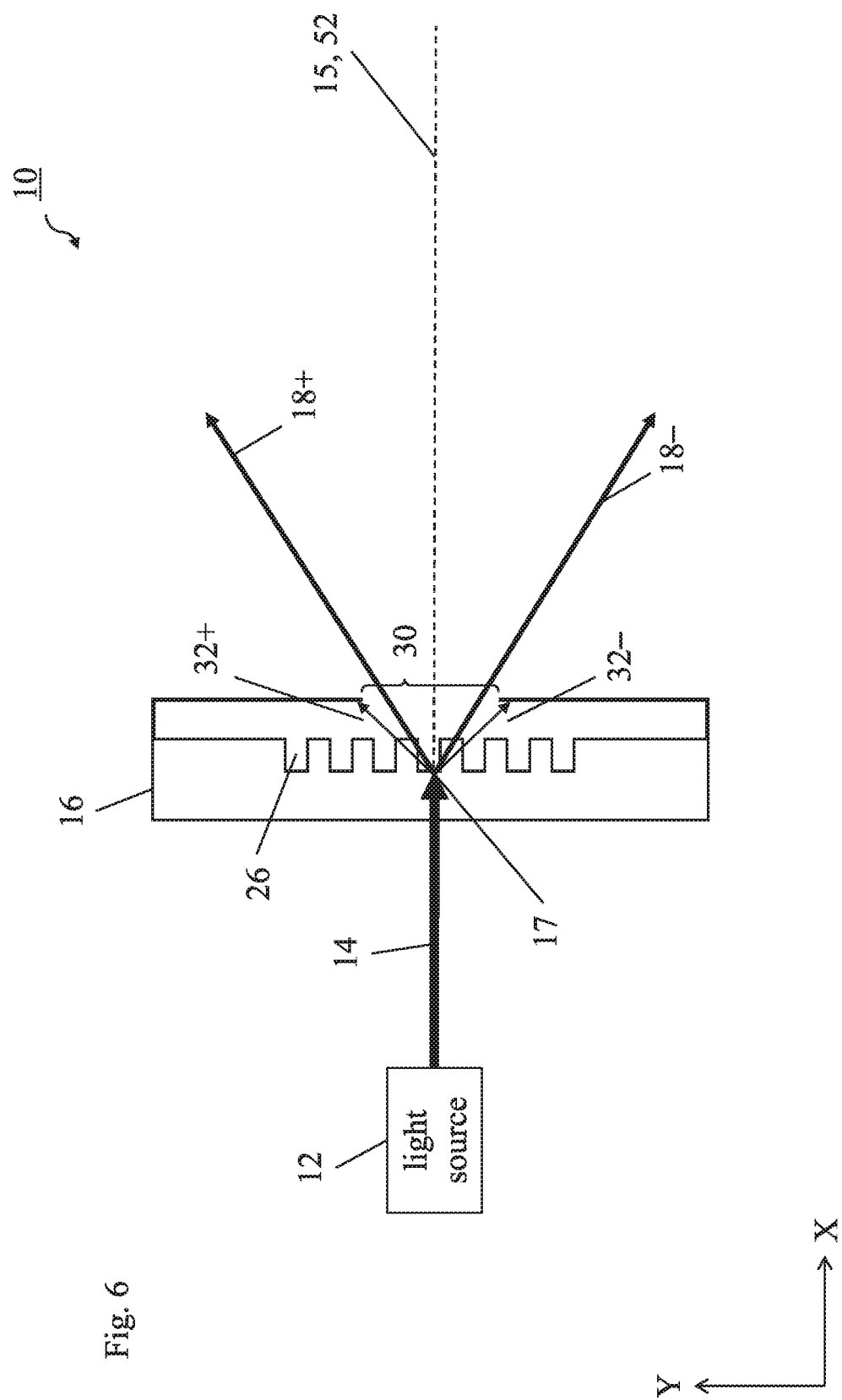
FIG. 6 illustrates the embodiment of FIG. 5 in which the 0-order beam is substantially suppressed due to configuration of the diffractive beam propagation device and the higher-order beams are suppressed by means of an aperture.

In some embodiments, it may additionally or alternatively be desired to substantially reduce 2nd or higher-order split beams which would otherwise be incident on the work piece 40 (or on a focusing system, which will be described later). For example, 2nd-order split beams 32+ and 32− (which may be collectively referred to as "2nd-order split beams 32") may be present respectively at 2nd-order diffraction angles of $\theta_{D2+}$ and $\theta_{D2-}$ from the incidence direction 15, as shown in FIG. 5. The magnitudes of the 2nd-order diffraction angles $\theta_{D2+}$, $\theta_{D2-}$ of the 2nd-order split beams 32 from the optical axis 22 may be respectively smaller than the magnitudes of the 1st-order diffraction angles $\theta_{D1+}$, $\theta_{D1-}$ of the 1st-order propagated beams 18 as shown in FIG. 5. To reduce the effects of the 2nd-order (or higher) beams 32, an aperture 30 as shown in FIG. 6 may be provided integrally, attachably, or separately from the diffractive beam propagation device 16 such that 2nd or higher-order split beams 32 of angles $\theta_{D2}$, each respectively greater in magnitude than those $\theta_{D1}$ of the 1st-order propagated beams 18, are substantially not able to exit the aperture 30 where they would otherwise eventually be incident on the work piece 40 (or on a focusing system, as described below).

In some embodiments, a drilling device 10 including a light source 12 and a diffractive beam propagation device 16 as described in any of the above embodiments may further include a focusing system 20, the focusing system 20 having an optical axis 22, wherein the one or more propagated beams 18 are incident on the focusing system 20 thereby becoming one or more direction-changed beams 24. That is, the focusing system 20 is provided to change the direction of the propagated beams 18, such that they are further propagated as direction-changed beams 24+ and 24− (hereby collectively referred to as "direction-changed beams 24"). Any focusing system 20 suitable for this purpose may be employed. In an exemplary embodiment, focusing system 20 consists of a single lens with a focal length f to its focal plane 21, as shown in FIG. 7. In the embodiment of FIG. 7, a drilling device 10 comprises a focusing system 20 and a diffractive beam propagation device 16 comprising or consisting of a transmissive diffraction grating such as those depicted in FIGS. 4-6 and described above. However, it is to be understood that the drilling device 10 may also comprise a focusing system 20 and a diffractive beam propagation device comprising or consisting of a reflective diffraction grating such as one of those depicted in FIGS. 2 and 3 and described above.

Propagated beams 18 originating from substantially the same origin area 17 when the origin area 17 is located substantially at a point along the focal plane 21 of the focusing system 20, which are incident on the focusing system 20, may result in direction-changed beams 24 which are substantially parallel to each other. The term "origin area" in this application refers to a substantially single and substantially small location or point which may in practice be small and disc or sphere-shaped. In exemplary embodiments, a diameter of such a small disc or sphere-shaped "origin area" may be on the order of millimeters or micrometers.

Propagated beams 18 originating from an origin area 17 farther than the focal length f away from the focusing system 20 which are incident on the focusing system 20 may result in direction-changed beams 24 which propagate toward each other (i.e. converge) along the component of their propagation direction parallel to the optical axis 22 (e.g., along the X direction), as shown in FIG. 7, which may correspond to a preferred embodiment of a drilling device 10 comprising a focusing system 20.

Propagated beams 18 originating from a location 17 closer than the focal length f to the focusing system 20 which are incident on the focusing system 20 may result in direction-changed beams 24 which propagate away from each other (i.e., diverge) along the component of their propagation direction parallel to the optical axis (along the X direction).

In the embodiment of FIG. 7, the light source 12 is configured to provide a light beam 14 along an incidence direction 15 which is substantially parallel to and aligned with the optical axis 22. The propagated beams 18 originate at an origin area 17 slightly farther from the focal plane 21 of the focusing system 20, such that the direction-changed beams 24 are incident on a work piece 40 at respective incidence angles not equal to zero with respect to the optical axis 22. For example, direction-changed beams 24 may be incident on a surface 42 of the work piece 40 at an angle of 0° to 10° (or −10° to 0°) with respect to the optical axis 22 (the X direction), or from perpendicular of the surface 42 of the work piece 40 in the case that the surface 42 of the work piece 40 is substantially planar and is substantially parallel to the planar surface 13 of the diffractive beam propagation device 16. The propagation direction of the propagated beams 18 and the direction-changed beams 24 may comprise a horizontal component in an X direction and a vertical component in a Y direction in FIG. 7. For example, depending on the desired hole size, the diffractive beam propagation device 16 can be distanced from the focal plane 21 by a value in the range of 30 to 500 mm.

The terms "horizontal" and "vertical" may be used with respect to the earth; that is, "horizontal" may refer to a direction or a plane substantially parallel or tangent to the surface of the earth while "vertical" may refer to a direction or a plane substantially perpendicular the surface of the earth. In some embodiments, the X direction may correspond to horizontal and the Y direction may correspond to vertical. In other embodiments, the X direction may correspond instead to vertical and the Y direction may correspond to horizontal. In still other embodiments, the X and Y directions may not correspond to horizontal or vertical, and the drilling device may be configured at a particular angle with respect to the surface of the earth. As a convention, a positive angle may refer to a clockwise direction from a reference axis while a negative angle may refer to a counterclockwise direction form a reference axis.

In a preferred embodiment, the propagated beams 18 substantially consist of two 1st-order beams, a positive and a negative 1st-order beam 18+, 18−, separated from each other by a diffraction angle $\theta_{D+}+\theta_{D-}$. A 0-order beam and 2nd or higher order beams may be substantially suppressed as explained above, e.g. in the embodiment illustrated in FIG. 6. In the case that the incidence direction 15 of the light beam 14 is provided substantially along the optical axis 22 of the focusing system 20, as shown in FIG. 7, the propagated beams 18 will each be provided substantially at a same magnitude of a diffraction angle from the optical axis 22, i.e. $|\theta_{D+}|=|\theta_{D-}|$. In other embodiments, the light beam 14 may be provided in an incidence direction 15 substantially parallel to but not substantially the same as the optical axis 22, or may instead not be provided substantially parallel to the optical axis 22.

In another embodiment, origin area 17 of the propagated beams 18 is provided substantially at a point along the focal plane 21 of the focusing system 20. Thus, as explained above, the propagated beams' 18 incidence on the focusing system 20 results in substantially parallel direction-changed beams 24. The direction-changed beams 24 may be incident on a work piece 40. For a work piece 40 with a substantially planar surface 42 substantially parallel to the planar surface 13 of the diffractive beam propagation device 16 (i.e. aligned with a Y-Z plane), the direction-changed beams 24 may be incident on the work piece 40 at points located along the Y plane at the surface 42 of the work piece 40 separated by a distance D. In the case of direction-changed beams 24, which are parallel, as in this embodiment, the distance between the direction-changed beams 24 may remain substantially constant along the X direction from the focusing system 20.

This diffraction angle $\theta=\theta_{D+}+\theta_{D-}$ and the distance D between the parallel direction-changed beams 24 may be determined by the following equations:

$$\theta = 2\theta_d \qquad (1)$$

$$D = 2f \tan\left(\sin^{-1}\left(\frac{\theta}{2}\right)\right) = 2f \tan\left(\sin^{-1}\left(\frac{\lambda}{\Lambda}\right)\right) \qquad (2)$$

In the above equations: f is the focal length of the focusing system 20, $\theta$ is the diffraction angle between the two propagated beams 18 ($\theta_{D+}+\theta_{D-}$), $\lambda$ is the wavelength of the light beam 14, $\Lambda$ is the period of the diffraction grating, and D is the distance between the parallel direction-changed split beams 24.

However, for improved drilling in certain applications, it may be desired to provide direction-changed split beams 24 which are not substantially parallel, as explained above. Such a preferred embodiment is shown in FIG. 7.

According to the invention, the diffractive beam propagation device 16 is configured to rotate around a rotation axis 52 which is substantially normal to the planar surface 13 of the diffractive beam propagation device 16. In an exemplary embodiment, the rotation axis 52 is substantially the same as the incidence direction 15 of the light beam and the optical axis 22 of the focusing system 20 (if the focusing system 20 is provided). In an exemplary embodiment, the diffractive beam propagation device 16 and, optionally, the focusing system 20, are configured to rotate at a rate of approximately 25 Hz to 33 kHz, such as at about 33 Hz. In other words, the rotation speed can be up to 200.000 rounds per minute, or even higher. Rotation of the diffractive beam propagation device 16 may result in rotation of the propagated beams 18 (and thus the direction-changed beams 24 if the focusing system 20 is provided). When the light source 12 and diffractive beam propagation device 16 are used in a drilling device, rotation of the diffractive beam propagation device 16 may melt and/or vaporize and/or expel material of the work piece 40 to produce or extend holes and/or cuts in the work piece 40. In an exemplary embodiment, the diffractive beam propagation device 16 rotates while the focusing system 20, if provided, is stationary. In another embodiment, the diffractive beam propagation device 16 and the focusing system 20 are coupled to a shared rotary stage and rotate together with the same frequency.

Figure 8:
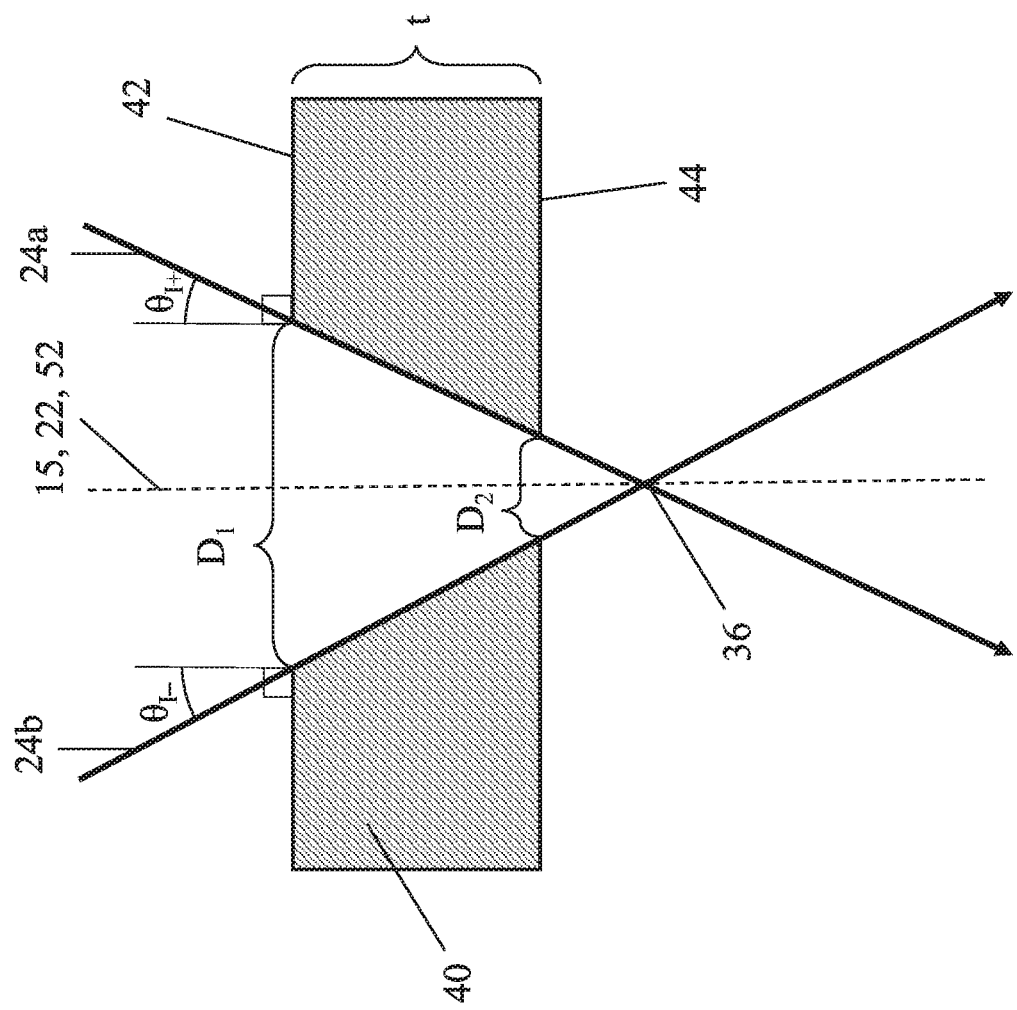
FIG. 8 illustrates the drilling of a work piece according to an embodiment of the present invention.

FIG. 8 illustrates the result of a drilling operation of a drilling device 10 according to an embodiment of the present invention. In this embodiment, the drilling device 10 is configured with a focusing system 20 such that direction-changed beams 24 are provided which converge in the horizontal component (along the X direction) of the propagation direction at a convergence point 36. For example, the direction-changed beams 24 may correspond to those in the embodiment of FIG. 7. The direction-changed beams 24 intersect at the convergence point 36 since in this embodiment the direction-changed beams 24 are provided both substantially in the same plane (the Z plane). In this embodiment, the convergence point 36 is configured to correspond to a location outside of the work piece 40, i.e. at a distance in the X direction farther than a thickness t of the work piece 40 from the surface 42 of the work piece 40, as shown in FIG. 8. Configuration of the location of the convergence point 36 may depend on at least one of the focusing system 20, the focal length f of the focusing system 20, the location of the origin area 17 of the propagated beams 18, and/or the diffraction angles $\theta_{D+}$, $\theta_{D-}$ of the propagated beams 18. In such a configuration, rotation of the diffractive beam propagation device 16 substantially about the rotation axis 52 (in this embodiment being substantially aligned with the optical axis 22 and the propagation direction 15 of the light beam 14) heats and/or melts and/or vaporizes and/or expels the material of the work piece 40 in a way which results in a substantially truncated cone-shaped hole, as shown in FIG. 8. The diameter $D_1$ of the base of the truncated cone-shaped hole at the surface 42 may be set according to the above parameters. Diameter $D_2$ of the truncated end of the truncated cone-shaped hole at an opposite surface 44 of the work piece 40 than the surface 42 of incidence of the direction-changed beams 24 is based on the angles of incidence $\theta_{I+}$, $\theta_{I-}$ of the direction-changed beams 24 and the thickness t of the work piece 40. It is noted, however, that the geometry, particularly the diameter $D_2$, may also be based on other process parameters such as the drilling time and the pulse energy.

In another embodiment, the convergence point 36 is configured to correspond to a point located substantially on the opposite surface 44 of the work piece 40. In this embodiment, rotation of the diffractive beam propagation device 16 about the rotation axis 52 causes material of the work piece 40 to be heated and/or melted and/or vaporized and/or expelled in a way which results in drilling of a substantially cone-shaped hole. A diameter of a base of the cone-shaped hole at the surface 42 may correspond to the distance D at the surface 42 of the work piece 40. An apex of the cone-shaped hole may, in this embodiment, be located at a thickness t of the work piece 40 away from the surface 42 of the work piece 40 in the X direction.

In another embodiment, it is also possible to configure the drilling device 10 such that the convergence point 36 is located in the X direction between the focusing system 20 and the surface 42 of the work piece 40, in which case rotation of the diffractive beam propagation device 16 substantially about the rotation axis 52 would drill a substantially truncated cone-shaped hole with a wider-diameter ($D_2$) base at the opposite surface 44 compared to a diameter ($D_1$) of a truncated end at the surface 42 of incidence of the direction-changed beams 24.

In another embodiment, the convergence point 36 is configured to be located substantially at the surface 42 of the work piece 40, and the drilled hole is substantially cone-shaped, with a wider-diameter base of the cone-shaped hole at the opposite surface 44 of the work piece 40 and an apex at the surface 42 of the work piece 40.

In another embodiment, the convergence point 36 is configured to be located inside the work piece 40, i.e. between the surface 42 and the opposite surface 44 located at the thickness t from the surface 42 in the X direction. In this case, the hole drilled is substantially in the shape of two cones stacked on their respective apexes, the base of one cone located at the surface 42 of the work piece 40 and tapering in the X direction to its apex located at the convergence point 36, at which point the apex of the second cone begins, the second cone flaring in the X direction to its base at the opposite surface 44.

Figure 9:
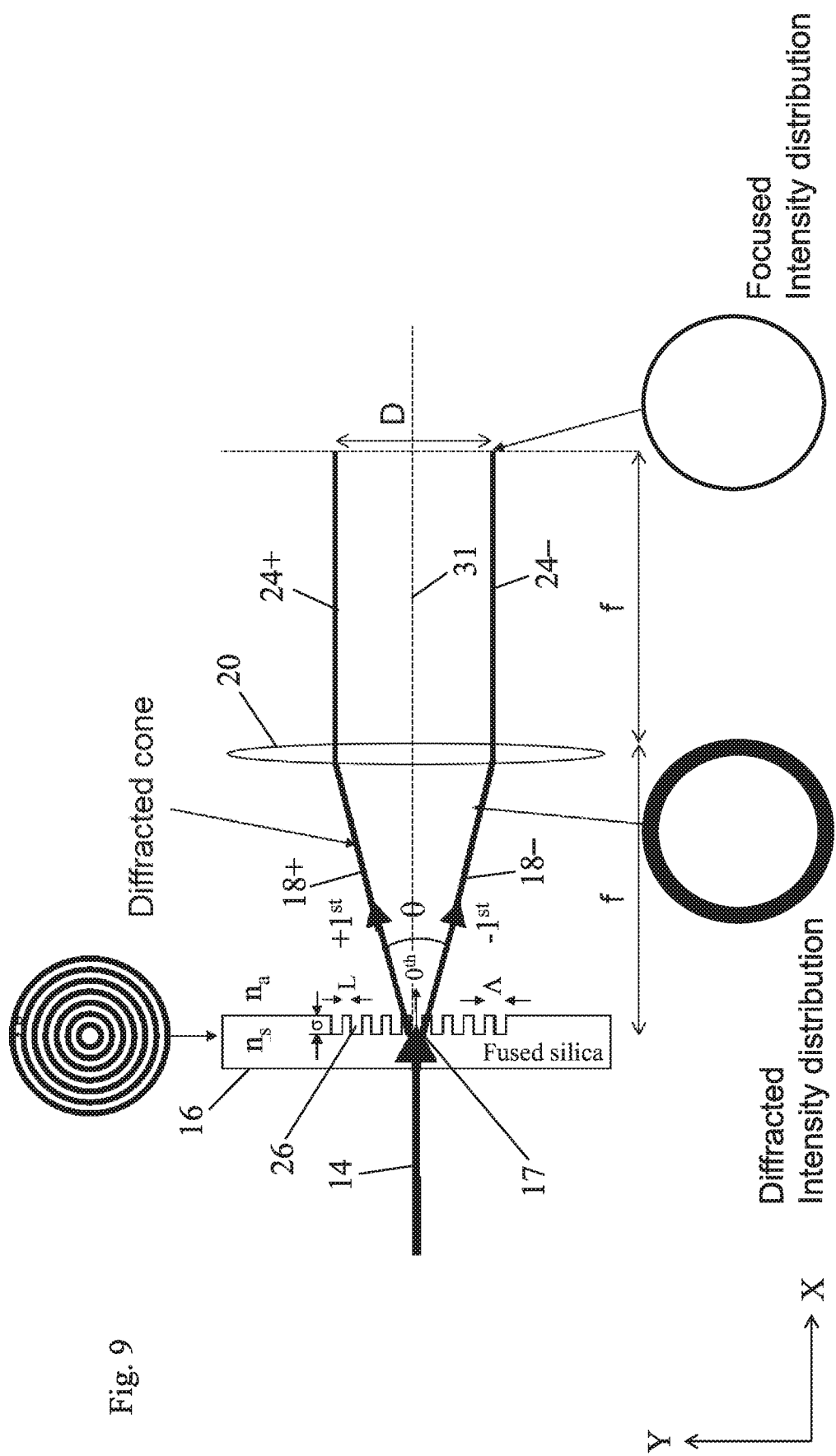
FIG. 9 illustrates another embodiment of the present invention in which the diffractive beam propagation device comprises a circular diffraction grating.

FIG. 9 illustrates an embodiment of the present invention, in which the diffractive beam propagation device 16 comprises a circular diffraction grating, the cross-section of which is shown on the top left of FIG. 9. An incident light beam 14 is diffracted by the diffractive beam propagation device 16, i.e. by the circular diffraction grating, such that the propagated beams 18 form a cone. In other words, the diffractive beam propagation device 16 propagates the light beam 14 such that the propagated beam 18 has a substantially circular or ringlike shape, i.e. that the propagated beam 18 surrounds a substantially circular area. The circular area which is surrounded by the propagated light beam 18 is perpendicular to the optical axis of the diffractive beam propagation device 16 and/or to the optical axis of the focusing system 20. The propagated ring shaped beam 18 is incident on the focusing system 20 and thereby becomes a direction-changed beam 24. The direction-changed beam 24 is incident on a work piece for drilling the work piece. In FIG. 9, the diffracted intensity distribution of the propagated beam 18 and the focused intensity distribution of the direction-changed beam 24 are also shown. In the illustrated example, the intensity distributions have a substantially circular shape. Thus, according to the embodiment of FIG. 9, due to the circular diffraction grating, it is not necessary to rotate the diffractive beam propagation device 16 in order to generate a propagated beam 18 that surrounds a substantially circular area. Compared to the previously described embodiments, according to which an incident beam is focused onto a spot and rotated by rotating the diffractive beam propagation device 16, the incident beam, according to the embodiment of FIG. 9, is focused on a substantially ringlike area. Accordingly, since the ringlike area, on which the beam of the present embodiment is focused on, is larger than a spot, on which the beam of the previously described embodiments is focused on, the energy of the incident light has to be larger in the present embodiment than the energy of light used in the previously described embodiments in order to achieve the same drilling effect. In other words, the laser power has to be increased. However, on the other hand, according to the embodiment of FIG. 9, it is not necessary to rotate the diffractive beam propagation device 16 so that the mechanical construction is much easier.

The above description relates to non-limiting exemplary embodiments of the present invention. Modifications of the above embodiments are possible without departing from the scope of the present invention as defined by the appended claims.

LIST OF REFERENCE NUMERALS 1 grating waveguide mirror (GWM)
2 grating layer
4 waveguide layer
6 highly reflective (HR) mirror
8 substrate
10 drilling device
12 light source
13 planar surface
14 light beam
15 incidence direction
16 diffractive beam propagation device
17 split location
18 propagated beams
20 focusing system
21 focal plane
22 optical axis
24 direction-changed beams
26 grooves
30 aperture
31 0-order beam
32 2nd-order propagated beams
36 convergence point
40 work piece
42 surface of the work piece
44 opposite surface of the work piece
52 rotation axis

What is claimed is:

1. A drilling device, comprising:
a light source configured to provide a light beam; and
a diffractive beam propagation device having a substantially planar surface,
wherein the light source is configured such that the light beam is incident on the substantially planar surface of the diffractive beam propagation device, and
wherein the diffractive beam propagation device is configured to propagate the light beam as one or more propagated beams such that the one or more propagated beams form a ring-like shape by forming one or more hollow cones, the diffractive beam propagation device comprising a circular diffraction grating adapted to propagate orming the light beam into the ring-like shape without the diffractive beam propagation device having to rotate.

2. The drilling device of claim 1, wherein the diffractive beam propagation device comprises a reflective diffraction grating.

3. The drilling device of claim 2, wherein the diffractive beam propagation device is configured to diffract the light beam such that one propagated beam comprises at least 90% of a total energy of the light beam.

4. The drilling device of claim 2, wherein the diffractive beam propagation device is configured to diffract the light beam such that at least two propagated beams together comprise at least 82% of a total energy of the light beam.

5. The drilling device of claim 1, wherein the light beam is incident on the diffractive beam propagation device at an angle, relative to a direction normal to the planar surface of the diffractive beam propagation device, which corresponds to the Littrow angle of the diffractive beam propagation device such that the one or more propagated beams comprise at least a −1st-order beam.

6. The drilling device of claim 1, wherein the diffractive beam propagation device comprises a transmissive diffraction grating, wherein the diffractive beam propagation device is configured to split the light beam into at least two propagated beams together comprising at least 82% of a total energy of the light beam, and wherein the light beam is incident on the diffractive beam propagation device at an angle substantially normal to the planar surface of the diffractive beam propagation device such that the at least two propagated beams comprise two 1st-order diffraction beams.

7. The drilling device of claim 6, wherein the diffractive beam propagation device has a grating depth ($\sigma$) such that a 0-order beam is substantially canceled, the grating depth ($\sigma$) being determined based on at least one of a wavelength of the one or more propagated beams, an index of refraction ($n_s$) of the diffractive beam propagation device, and a duty cycle ($l/\Lambda$) of the diffractive beam propagation device.

8. The drilling device of claim 6, wherein all nth-order diffraction beams are substantially dampened by one or more apertures provided in the diffractive beam propagation device, and wherein n is an integer equal to or greater than 2.

9. The drilling device of claim 1, further comprising a focusing system having an optical axis, wherein the one or more propagated beams are incident on the focusing system and thereby become one or more direction-changed beams.

10. The drilling device of claim 9, wherein the diffractive beam propagation device is provided such that an origin area of the one or more propagated beams is substantially not located at a focal plane of the focusing system such that the one or more direction-changed beams are substantially not parallel, and wherein the origin area is located closer to the focusing system than the focal plane of the focusing system or farther away from the focusing system than the focal plane such that the one or more direction-changed beams converge in a propagation direction of the one or more direction-changed beams.

11. The drilling device of claim 9, wherein the diffractive beam propagation device and the focusing system are further configured to translate substantially along the optical axis of the focusing system, and wherein translation of the diffractive beam propagation device from a first position to a second position changes a first distance between the one or more direction-changed beams when the diffractive beam propagation device is at the first position, to a second distance between the one or more direction-changed beams when the diffractive beam propagation device is at the second position.

12. A method for drilling a hole in a work piece, the method comprising:
providing:
a light source; and
a diffractive beam propagation device having a substantially planar surface,
wherein the light source provides a light beam incident on the substantially planar surface of the diffractive beam propagation device, and
wherein the diffractive beam propagation device propagates the light beam as one or more propagated beams such that the one or more propagated beams form a ring-like shape by forming one or more hollow cones, the diffractive beam propagation device comprising a circular diffraction grating adapted to propagate the light beam into the ring-like shape without the diffractive beam propagation device having to rotate.

\* \* \* \* \*